(12) United States Patent
Mathony

(10) Patent No.: US 6,909,952 B2
(45) Date of Patent: Jun. 21, 2005

(54) DEVICE FOR CONTROLLING/REGULATING THE OPERATIONAL SEQUENCES IN A MOTOR VEHICLE

(75) Inventor: Hans-Joerg Mathony, Tamm-Hohenstange (DE)

(73) Assignee: Robert Bosch GmbH, Stuttgart (DE)

( * ) Notice: Subject to any disclaimer, the term of this patent is extended or adjusted under 35 U.S.C. 154(b) by 188 days.

(21) Appl. No.: 09/960,571

(22) Filed: Sep. 21, 2001

(65) Prior Publication Data

US 2002/0077735 A1 Jun. 20, 2002

(51) Int. Cl.$^7$ .................. B60R 22/00; G05D 1/00; G05D 3/00; G06F 17/00; G06F 7/00
(52) U.S. Cl. ................ 701/48; 701/33; 701/37; 701/41; 701/45; 701/49; 701/51; 709/249; 709/253; 710/306; 700/19; 700/20
(58) Field of Search .................. 700/2, 4, 7, 19, 700/20, 82; 701/36, 37, 41, 45, 48, 49, 51, 53, 29, 33; 307/9.1, 10.1–10.8; 709/250, 253, 223, 249; 710/305, 306

(56) References Cited

U.S. PATENT DOCUMENTS

| | | | | |
|---|---|---|---|---|
| 4,607,256 A | * | 8/1986 | Henzel ................ 340/825.52 |
| 4,734,861 A | * | 3/1988 | Bertolasi et al. ............ 701/67 |
| 4,910,658 A | * | 3/1990 | Dudash et al. ................ 700/9 |
| 4,964,076 A | * | 10/1990 | Schurk ...................... 340/825.5 |
| 6,107,696 A | | 8/2000 | Peter et al. .................... 307/31 |
| 6,115,831 A | | 9/2000 | Hanf et al. .................... 714/43 |
| 6,226,497 B1 | * | 5/2001 | Guntzer et al. ............ 455/66.1 |
| 6,292,741 B1 | * | 9/2001 | Bitzer et al. ................ 701/115 |
| 6,326,704 B1 | * | 12/2001 | Breed et al. ................ 307/9.1 |
| 6,338,010 B1 | * | 1/2002 | Sparks et al. .................. 701/1 |
| 6,430,478 B2 | * | 8/2002 | Heckmann et al. ............ 701/1 |
| 6,526,460 B1 | * | 2/2003 | Dauner et al. ................ 710/65 |
| 6,529,124 B2 | * | 3/2003 | Flick ........................ 340/426.1 |
| 6,747,365 B2 | * | 6/2004 | Reinold et al. ............. 307/9.1 |
| 2003/0052801 A1 | * | 3/2003 | McClure et al. | |
| 2003/0135678 A1 | * | 7/2003 | Andre | |

FOREIGN PATENT DOCUMENTS

| | | | | |
|---|---|---|---|---|
| DE | 43 01 551 | 7/1994 | .......... H02H/9/00 |
| DE | 196 11 942 | 10/1997 | .......... G06F/13/40 |
| EP | 0 547 957 A1 | 6/1993 | .......... B60R/16/02 |
| EP | 0 554 465 | 8/1993 | .......... B60R/16/02 |
| EP | 0 547 957 B1 | 3/1996 | .......... B60R/16/02 |
| WO | WO 00/07849 | 2/2000 | .......... B60R/16/02 |

* cited by examiner

Primary Examiner—Anthony Knight
Assistant Examiner—Crystal J. Barnes
(74) Attorney, Agent, or Firm—Kenyon & Kenyon

(57) ABSTRACT

A device for controlling/regulating the operational sequences in a motor vehicle. The device has a number of arrangements for control/regulation. Each of the arrangements includes a processor having a storage unit and an input and output unit. A characteristic of this device lies in spatially combining the arrangements on a carrier and interconnecting them, using a communications bus.

12 Claims, 2 Drawing Sheets

DEVICE FOR CONTROLLING/REGULATING THE OPERATIONAL SEQUENCES IN A MOTOR VEHICLE

FIELD OF THE INVENTION

The present invention relates to a device for controlling and regulating the operational sequences in a motor vehicle.

BACKGROUND INFORMATION

In motor vehicles, there are numerous means for controlling and regulating the operational sequences. During operation, each of these means controls or regulates a functional unit of the motor vehicle. Thus, controlling means are provided, e.g. for the engine, the transmission, the central locking system, and the lighting system. There are regulating means for, e.g. the anti-lock braking system, the airbags, and the diagnostic system. An electronic stability program may also be provided.

From the related art, it is known to directly position each means at the system to be controlled or regulated. However, this has proven to be difficult and, therefore, cost-intensive. As a rule, the means are separate electronic control units, which are networked or connected to each other, using a data bus or conventional cable, respectively.

SUMMARY OF THE INVENTION

An object of the present invention is to propose a device for controlling or regulating the operational sequences in a motor vehicle, which is simpler and more inexpensive to manufacture in comparison with known devices.

The present invention starts out from a device for controlling/regulating the operational sequences in a motor vehicle, the device having a number of means for control/regulation, and each of the means having a processor that includes a storage unit and an input and output unit. The device according to the present invention distinguishes itself in that the means are spatially combined on one carrier, and are interconnected by a communications bus, e.g. a CAN.

Therefore, each functional unit to be controlled and regulated is assigned a means for control or regulation on the carrier. However, a means can also include control systems/regulating systems for a plurality of functional units, e.g. a light control system and/or a central locking system and/or a vehicle immobilizer. A separate data bus (sensor/actuator bus, e.g. 1-wire) can be used for connecting sensors and actuators, which means that the number of lines and the contacts at the central carrier are reduced. These means include a processor having a storage unit and an input and output unit. A communications bus on the carrier interconnects the means. This communications bus is coupled to the data bus of the motor vehicle. Using the input and output units, the means communicate with sensors and actuators which are situated directly at the systems to be controlled and regulated.

In comparison with the known devices, the device according to the present invention can considerably reduce costs by lowering the number of cable harnesses and contacts. In addition, the omission of lines and contacts increases the reliability.

It is advantageous when the carrier is a printed circuit board, because a pre-wired, printed circuit board can be quickly fitted with the components appropriate thereto.

An advantageous further refinement of the present invention provides a plurality of voltage regulators. In one special case, each processor is assigned exactly one voltage regulator. This ensures a high measure of operational reliability.

In order to ensure that vital functions can continue to be executed in the case of the main battery breaking down, a preferred refinement provides an auxiliary energy source on the carrier.

The communication bus of the carrier can preferably be decoupled from the data bus of the motor vehicle, using a so-called gateway. A gateway is a device for connecting or coupling different networks or bus systems. Thus, not only is the operational reliability increased, but also the available bus band width can be fully used for internal communication.

DETAILED DESCRIPTION

Figure 1:
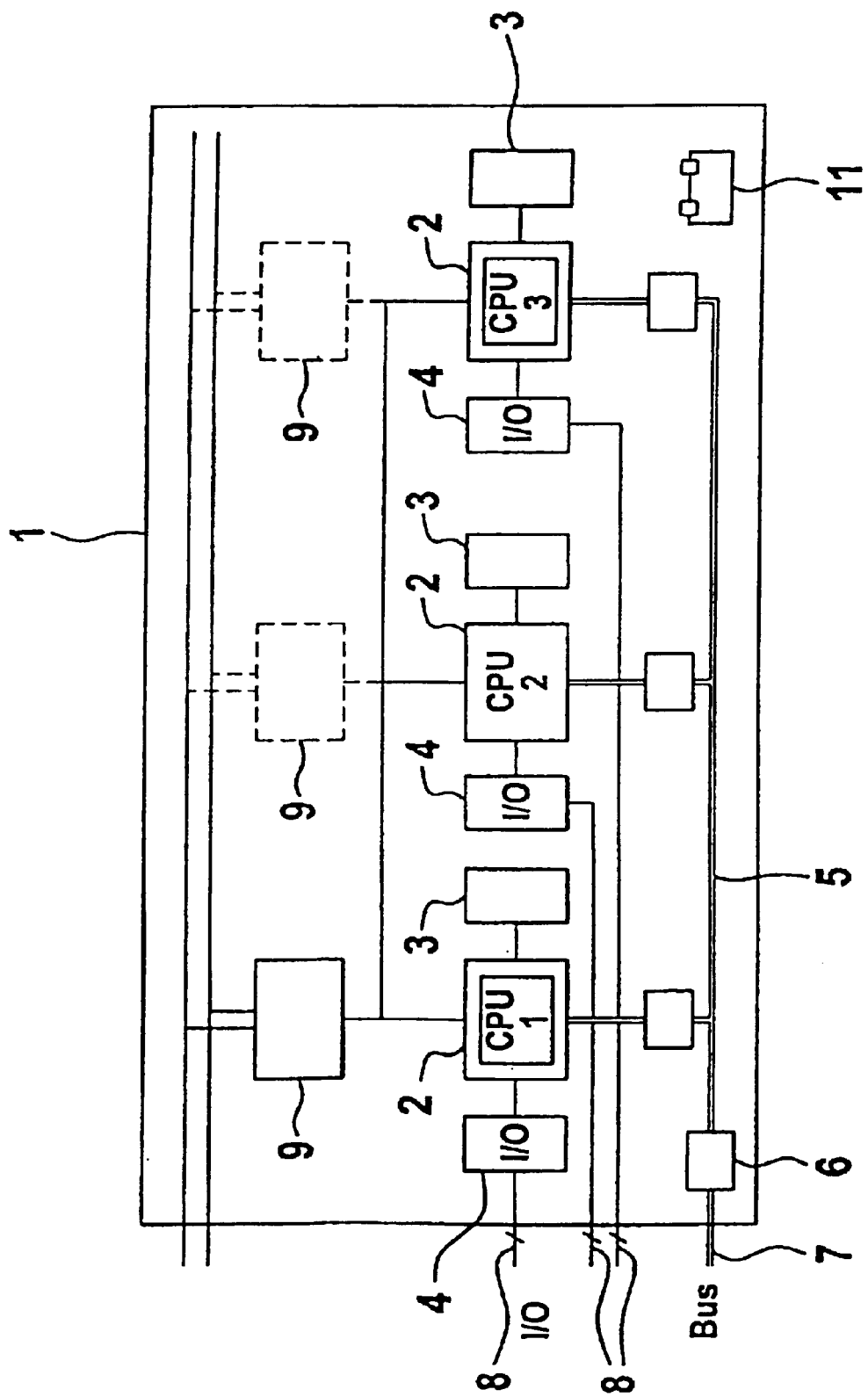
FIG. 1 shows a schematic representation of the device according to the present invention.

Three controlling or regulating means are provided on a printed circuit board 1 (see FIG. 1). Each of these have a processor 2, a storage unit 3, and an input and output unit 4. The three means are interconnected by a communications bus 5. Communications bus 5 of the device is coupled to data bus 7 of the motor vehicle by a gateway 6. Using gateway 6, communications bus 5 of the device can be decoupled from data bus 7 of the motor vehicle.

Input and output units 4 are connected by data lines 8 to the sensors and actuators situated in the motor vehicle.

Each means is assigned a voltage regulator 9. Voltage regulators 9 are connected to a main battery 10 (FIG. 2).

In addition, an auxiliary energy source 11, which ensures that important functions can be carried out in the case of a breakdown of main battery 10, e.g. in an accident, is seated on a printed circuit board 1.

Figure 2:
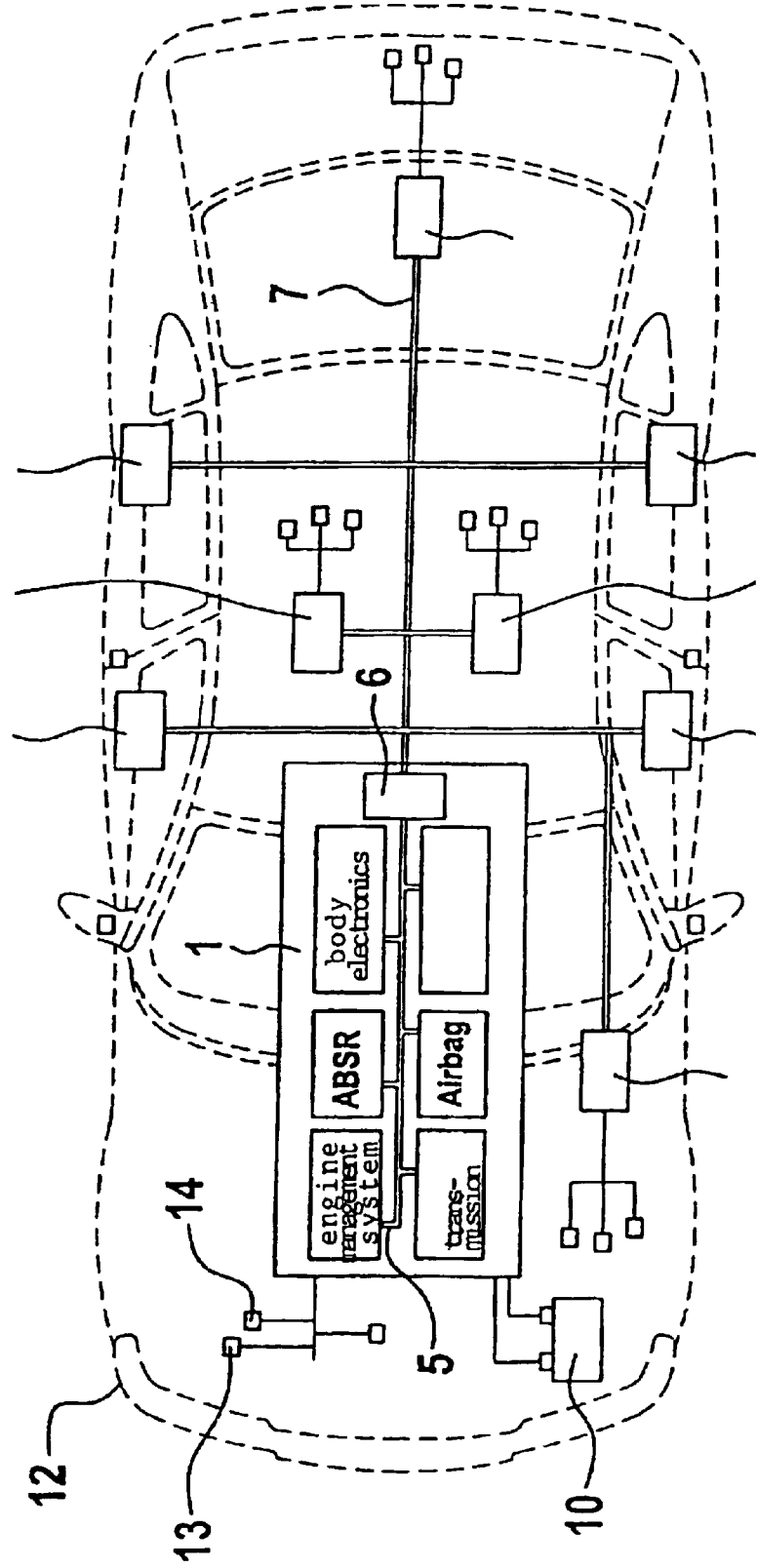
FIG. 2 shows a schematic representation of a motor vehicle 12 having the device according to the present invention.

The device of the present invention is centrally located in motor vehicle 12 (see FIG. 2). Provided on the printed circuit board 1 supporting the device are, inter alia, means for controlling or regulating the engine management system, the anti-lock braking system, the body electronics, the transmission, and the airbag. In addition, previously mentioned gateway 6 is drawn in schematically.

The device is connected to main battery 10 of motor vehicle 12.

The means on printed circuit board 1 are interconnected by communications bus 5, which in turn is coupled to data bus 7 of motor vehicle 12. Sensors 13 and actuators 14 are set up at different positions in motor vehicle 12. They communicate with the device via data lines 8, communications bus 5, and data bus 7.

In the represented design, some of the sensors 13 and actuators 14 are in the form of mechatronic units in electronic modules, which are linked to the central computer by a sensor/actuator. This reduces the number of lines.

The representation clearly shows that, despite the systems to be controlled and regulated being dispersed within motor vehicle 12, the means for control and regulation are spatially combined at one location, namely on printed circuit board 1.

What is claimed is:

1. A device for one of controlling and regulating an operation sequence in a motor vehicle, comprising:

a printed circuit board;

a communications bus integrated on the printed circuit board;

a gateway connected to the communications bus and a data bus of the motor vehicle; and a plurality of arrangements for performing one of a control and a regulation, each one of the arrangements including a processor, a storage unit and an input and output unit, wherein:

the plurality of arrangements are integrated on the printed circuit board, and are interconnected by the communications bus.

2. The device according to claim 1, further comprising:

a plurality of voltage regulators.

3. The device according to claim 2, wherein:

the plurality of voltage regulators are connected to a battery.

4. The device according to claim 1, further comprising:

an auxiliary energy source.

5. The device according to claim 4, wherein:

the auxiliary energy source is arranged on a printed circuit board.

6. The device according to claim 1, wherein:

the communications bus is to be decoupled from the data bus of the motor vehicle.

7. The device according to claim 1, wherein:

the communications bus includes a CAN communications bus.

8. The device according to claim 1, wherein:

the device is connected to a battery.

9. The device according to claim 1, wherein:

the plurality of arrangements includes at least three arrangements.

10. The device according to claim 1, wherein:

the plurality of arrangements includes three arrangements.

11. The device according to claim 1, further comprising:

a plurality of input and output arrangements that are connected to at least one of a sensor and an actuator arranged in the motor vehicle; and at least one data line connected to each of the input and output arrangements.

12. The device according to claim 1, wherein:

the plurality of arrangements one of control and regulate at least one of an engine management system, an anti-lock braking system, body electronics, a transmission, and an airbag.

* * * * *